United States Patent
Hayes et al.

(10) Patent No.: US 7,023,578 B2
(45) Date of Patent: Apr. 4, 2006

(54) PRINTER IMAGE PROCESSING SYSTEM WITH CUSTOMIZED TONE REPRODUCTION CURVES

(75) Inventors: Katherine E. Hayes, Rochester, NY (US); Dale Knutsen, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 957 days.

(21) Appl. No.: 09/767,938

(22) Filed: Jan. 23, 2001

(65) Prior Publication Data

US 2002/0097410 A1    Jul. 25, 2002

(51) Int. Cl.
G06F 15/00    (2006.01)
H04N 1/46    (2006.01)

(52) U.S. Cl. ..................... 358/1.9; 358/504
(58) Field of Classification Search ............. 358/1.9, 358/1.2, 1.6, 3.01, 3.1, 501, 515, 522, 504, 358/530, 1.15, 442, 519; 382/165, 167, 169, 382/274, 162; 345/600, 776, 833; 348/651; 399/87; 707/102

See application file for complete search history.

(56) References Cited

U.S. PATENT DOCUMENTS

| | | | | |
|---|---|---|---|---|
| 4,472,736 A * | 9/1984 | Ushio et al. | ................. | 358/515 |
| 5,208,911 A * | 5/1993 | Newman et al. | ............ | 345/600 |
| 5,255,085 A * | 10/1993 | Spence | ........................ | 358/527 |
| 5,257,115 A * | 10/1993 | Takayanagi | ................. | 358/3.1 |
| 5,260,806 A * | 11/1993 | Samworth | ................... | 358/3.01 |
| 5,287,418 A * | 2/1994 | Kishida | ........................ | 382/169 |
| 5,347,369 A * | 9/1994 | Harrington | .................. | 358/401 |
| 5,347,374 A * | 9/1994 | Fuss et al. | .................. | 358/522 |
| 5,521,723 A * | 5/1996 | Madden et al. | ............. | 358/501 |
| 5,541,028 A * | 7/1996 | Lee et al. | ..................... | 430/30 |
| 5,579,446 A * | 11/1996 | Naik et al. | .................... | 358/1.9 |
| 5,606,395 A * | 2/1997 | Yang et al. | .................... | 399/81 |
| 5,666,470 A * | 9/1997 | Parker | ........................ | 358/1.6 |
| 5,687,297 A * | 11/1997 | Coonan et al. | ............. | 358/1.2 |
| 5,751,433 A * | 5/1998 | Narendranath et al. | ...... | 358/1.9 |
| 5,751,434 A * | 5/1998 | Narendranath et al. | ...... | 358/1.9 |
| 5,777,656 A * | 7/1998 | Henderson | .................. | 347/251 |
| 5,963,244 A | 10/1999 | Mestha et al. | ............. | 347/251 |
| 6,035,152 A * | 3/2000 | Craig et al. | ................... | 399/49 |
| 6,067,406 A * | 5/2000 | Van Hoof et al. | ........... | 358/1.9 |
| 6,097,836 A * | 8/2000 | Inoue | ........................ | 382/165 |
| 6,115,717 A * | 9/2000 | Mehrotra et al. | ........... | 707/102 |
| 6,141,464 A * | 10/2000 | Handley | ..................... | 382/287 |
| 6,205,246 B1 * | 3/2001 | Usami | ........................ | 382/167 |
| 6,304,338 B1 * | 10/2001 | Sumiuchi et al. | ........... | 358/1.9 |
| 6,441,869 B1 * | 8/2002 | Edmunds | .................... | 348/651 |
| 6,462,835 B1 * | 10/2002 | Loushin et al. | ............. | 358/1.9 |
| 6,469,805 B1 * | 10/2002 | Behlok | ........................ | 358/1.9 |
| 6,484,631 B1 * | 11/2002 | Degani et al. | ............. | 101/171 |
| 6,515,770 B1 * | 2/2003 | Rao et al. | .................. | 358/3.13 |
| 6,529,291 B1 * | 3/2003 | Schweid et al. | ............. | 358/1.9 |

(Continued)

FOREIGN PATENT DOCUMENTS

EP    1152597 A2 *    11/2001

(Continued)

*Primary Examiner*—Madeleine A V Nguyen
(74) *Attorney, Agent, or Firm*—Perman & Green, LLP

(57) ABSTRACT

A customized tone reproduction curve is created by the operation of an independent processor system associated with the image processor for a full color printer. Data for the customized tone curves is entered through a customizing interface according to the discretion of the user. The customized reproduction tone curve is then combined with the original color data to generate customized color image data. The customized color data is then calibrated by combination with the current calibration tone reproduction curve.

17 Claims, 3 Drawing Sheets

U.S. PATENT DOCUMENTS

| | | | |
|---|---|---|---|
| 6,563,945 B1 * | 5/2003 | Holm | 382/162 |
| 6,587,129 B1 * | 7/2003 | Lavendel et al. | 345/776 |
| 6,614,456 B1 * | 9/2003 | Rzepkowski et al. | 345/833 |
| 6,618,170 B1 * | 9/2003 | Whiting et al. | 358/1.9 |
| 6,628,843 B1 * | 9/2003 | Eschbach et al. | 382/274 |
| 6,694,109 B1 * | 2/2004 | Donaldson et al. | 399/49 |
| 6,707,938 B1 * | 3/2004 | de Queiroz et al. | 382/162 |
| 6,755,498 B1 * | 6/2004 | Revie et al. | 347/15 |
| 6,766,263 B1 * | 7/2004 | Stokes | 702/88 |
| 6,775,029 B1 * | 8/2004 | Wen et al. | 358/1.9 |
| 6,816,269 B1 * | 11/2004 | Loce et al. | 358/1.12 |
| 2002/0067848 A1 * | 6/2002 | Queiroz et al. | 382/162 |
| 2002/0075379 A1 * | 6/2002 | Klassen et al. | 347/251 |
| 2002/0085235 A1 * | 7/2002 | Degani et al. | 358/3.06 |
| 2004/0046874 A1 * | 3/2004 | Tse | 348/224.1 |
| 2004/0199346 A1 * | 10/2004 | Stokes | 702/88 |
| 2004/0205449 A1 * | 10/2004 | Hayes | 715/500 |

FOREIGN PATENT DOCUMENTS

| | | |
|---|---|---|
| EP | 1152598 A2 * | 11/2001 |
| EP | 1156666 A2 * | 11/2001 |

* cited by examiner

PRINTER IMAGE PROCESSING SYSTEM WITH CUSTOMIZED TONE REPRODUCTION CURVES

FIELD OF THE INVENTION

The invention relates to a system for allowing the customized control of color image data in a printer to adjust the rendered colors of the printer at the discretion of the user. This is accomplished independently of the printer's calibration system.

BACKGROUND OF THE INVENTION

Full color printing has become a desired goal of office products. Digital printing machines typically provide operators with the ability to adjust print appearance before the start of a print run. For example, color adjustments allow operators to optimize print appearance of output copies.

Color printing is accomplished by providing multiple layers, or separations, of colorants, such as ink, toner, etc. on a page. For example, colors are commonly provided by combinations of cyan (C), magenta (M), yellow (Y), and black (K) inks. The CMYK process is in general use.

The process of color printing involves a significant number of complex variables which need to be monitored and adjusted to insure accurate color rendering. Process control for color printing involves the collection of data about the current color rendering characteristics of the printer. Calibration data is generally collected by generating electrostatic test patches which are traditionally printed in interdocument zones on the photoreceptor. These data are used to measure the deposition of toner on paper and result in tone reproduction curve or other expression of calibration reference data. The tone reproduction curve represents a correspondence of printer inputs to printer outputs. Several systems for measuring and estimating tone reproduction curves from color image data are described in U.S. Pat. Nos. 6,035,152 and 5,963,244 commonly owned by the assignee of this application and incorporated herein by reference. Higher levels of calibration are available in which parameters such as gray balance and cross separation are also calibrated.

A process control which uses tone reproduction curves is described in U. S. Pat. No. 5,777,656, commonly owned by the assignee of this application. The disclosure of the '656 patent is incorporated herein by reference. In the system described in the '656 patent, there is provided a method of maintaining tone reproduction in a printer, including the steps of generating a continuous tone image based on an original document. Through raster image processing the tone image is encoded by dividing the continuous tone image into a plurality of pixels and generating pixel data for each pixel. The pixel data has a position for each pixel and a desired darkness of gray of the corresponding pixel. Representative halftone targets or patches are generated on the photosensitive surface with toner. The amount of toner on each of the representative halftone targets is then sensed to generate a representative tone reproduction curve. A feedback signal is produced by comparing the representative tone reproduction curve to a setup calibration tone curve. The pixel data of each pixel of the final halftone image is adjusted to compensate for deviation between representative tone reproduction curve and the setup calibration tone curve during printer operation to achieve the desire tonality of the final halftone image.

The above control process is designed to maintain a consistent tonal quality to multiple copies or prints of the same image. The output, however, is determined by the tonal quality as set up by the calibration tone reproduction curve. Since modern color printers are capable of producing extremely complex and interesting images, there is a need to allow further adjustment of the output image color by the user. Some control processes allows an adjustment of the output image color according to predetermined adjustment curves and data or by partial adjustment of the calibration tone curve, but such schemes make it difficult to reproduce a particular output in subsequent processes. It is a purpose of this invention to provide a system for allowing the user to adjust the color independent of calibration. It is also a purpose of this invention to incorporate this capability into a system which also relies on color maintenance through the use of calibration tone reproduction curves or other similar mechanisms.

SUMMARY OF THE INVENTION

The user of a color printing machine is provided with the means to adjust the output color of a printing machine. Through the use of a user interface, which is operatively associated with the control processor of the printer, customized tone reproduction curves may be created. The components of this system may be executed as a part of the printer or independently as an application in a remote data input station of a network, such as a personal computer. Data for the customized tone curves is entered through a customizing interface according to the discretion of the user. A color maintenance processor generates calibration tone reproduction curves based on the color rendering characteristics of the printing system. The calibration tone reproduction curves may be used to adjust the image data obtained from an original document. The color maintenance processor combines the document color data with the customized tone reproduction curves and with calibration tone reproduction curves to accurately render the colors selected by the user. The customized data is identified and saved in memory for use on subsequent printing projects. The customization system includes an user interface, processor module and memory. The user may edit and/or use the saved customized data.

DESCRIPTION OF THE DRAWINGS

The present invention will now be described by way of example with reference to the accompanying drawings, wherein like reference numerals refer to like elements, and in which.

DESCRIPTION OF THE PREFERRED EMBODIMENT

Figure 1:
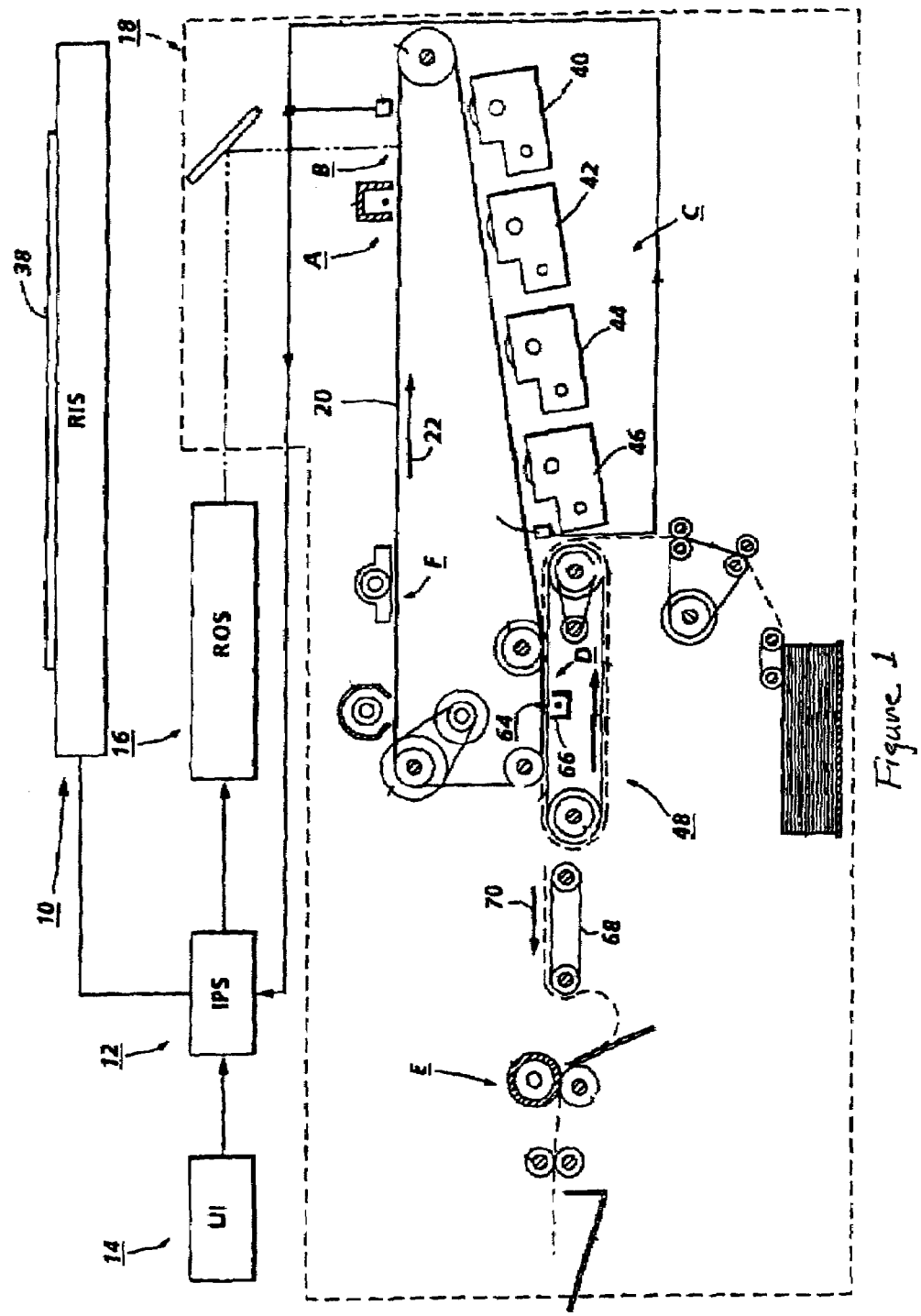
FIG. 1 is a schematic view of an exemplary multicolor electrostatic printing machine.

For a general understanding of the features of the present invention, reference is made to the drawing wherein like references have been used throughout to designate identical elements. A schematic diagram of a typical electrostatic printing machine is shown in FIG. 1. It will become evident from the following discussion that the present invention is equally well-suited for use in a wide variety of printing systems including ionographic printing machines and discharge area development systems, as well as other more general non-printing systems providing multiple or variable outputs such that the invention is not necessarily limited in its application to the particular system shown herein.

Turning initially to FIG. 1, before describing the particular features of the present invention in detail, an exemplary electrostatic copying apparatus will be described. The exemplary electrostatic system may be a multicolor digital copier, as for example, the Xerox Corporation "5775" copier. To initiate the copying process, a multicolor original document 38 is positioned on a raster input scanner, indicated generally by reference numeral 10. Raster input scanner 10 contains document illumination lamps, optics, a mechanical scanning drive, and a charge coupled device (CCD array) for capturing the entire image from original document 38. The raster input scanner 10 converts the image to a series of raster scan lines and measures a set of primary color densities, i.e. red, green and blue densities, at each point of the original document. This information is transmitted as an electrical signal to an image processing system, indicated generally by the reference numeral 12, which converts the set of red, green and blue density signals to a set of calorimetric coordinates. The image processing system contains control electronics for preparing and managing the image data flow to a raster output scanner, indicated generally by the reference numeral 16.

A user interface, indicated generally by the reference numeral 14, is provided for communicating with image processing system 12. user interface 14 enables an operator to control the various operator adjustable functions whereby the operator actuates the appropriate input keys of user interface 14 to adjust the parameters of the copy. user interface 14 may be a touch screen, or any other suitable device for providing an operator interface with the system. The output signal from user interface 14 is transmitted to image processing system 12 which then transmits signals corresponding to the desired image to raster ouput scanner 16.

The raster output scanner 16 exposes the photoconductive belt 20 of printer 18 to record a set of four primary latent images thereon corresponding to the signals transmitted from image processing system 12. These developed images are subsequently transferred to a copy sheet in superimposed registration with one another to form a multicolored image on the copy sheet which is then fused thereto to form a color copy.

Photoconductive belt 20 is entrained about a series of transfer rollers which operate to advance photoconductive belt 20 in the direction of arrow 22 to sequentially advance successive portions of the photoconductive belt 20 through the various processing stations disposed about the path of movement thereof.

Initially, a portion of photoconductive belt 20 passes through a charging station, indicated generally by the reference letter A. At charging station A, a charging device generates a charge voltage to charge photoconductive belt 20 to a relatively high, substantially uniform voltage potential.

Next, the charged photoconductive surface is rotated to an exposure station, indicated generally by the reference letter B. Exposure station B receives a modulated light beam corresponding to information derived by raster input scanner 10. The modulated light beam impinges on the surface of photoconductive belt 20, selectively illuminating the charged surface of photoconductive belt 20 to form an electrostatic latent image thereon. The photoconductive belt 20 is exposed four times to record three latent images representing each color and the undercolor black.

After the electrostatic latent images have been recorded on photoconductive belt 20, the belt is advanced toward a development station, indicated generally by the reference letter C. However, before reaching the development station C, the photoconductive belt 20 passes next to a voltage monitor for measurement of the voltage potential at the surface of the photoconductive belt 20. The voltage potential measurement of the photoconductive belt 20 is utilized to determine specific parameters of the printing process.

The development station C includes four individual developer units indicated by reference numerals 40, 42, 44 and 46. Developer units 40, 42, and 44, respectively, apply toner particles of a specific color corresponding to the specific color separated electrostatic latent images sequentially recorded on the photoconductive surface.

After development, the toner image is moved to a transfer station D at which the toner image is transferred to a print medium for example a sheet of paper. A print medium transport apparatus, indicated generally by the reference numeral 48, moves the sheet into contact with photoconductive belt 20.

In transfer zone 64, a corona generating device charges the sheet to the proper magnitude and polarity for attracting the toner image from photoconductive belt 20.

After the last transfer operation, the sheet transport system directs the sheet to a conveyor, indicated generally by the reference numeral 68. Vacuum conveyor 68 transports the sheet, in the direction of arrow 70, to a fusing station, indicated generally by the reference letter E, where the transferred toner image is permanently fused to the sheet. The last processing station in the direction of movement of belt 20, as indicated by arrow 22, is a cleaning station, indicated generally by the reference letter F.

Variations of specific electrostatic processing subsystems or processes may be expected without affecting the operation of the present invention.

In order to maintain the consistency of color tone, the system of this invention utilizes a tone reproduction curve controller. The control system is composed of 3 parts or levels. At the lowest level, level 1, control of the latent image on the photoreceptor is achieved.

The Level 2 control sends the appropriate setpoints for the Level-1 control. The value of these setpoints is determined by measurements of toner on the photoreceptor using a device such as optimized color densitometer.

To control the tone reproduction in the highlight and shadow regions of the tone reproduction curve, a Level-3 controller is used with halftone patch sensing as described in U.S. Pat. No. 5,777,656, referenced above.

By some means, perhaps a factory or field calibration, a calibration tone reproduction curve, or setcurve, is established in the control software. The Level-3 control detects the change of tone reproduction and computes a new lookup table or tone reproduction curve that compensates for the measured deviation from the original setcurve.

Figure 2:
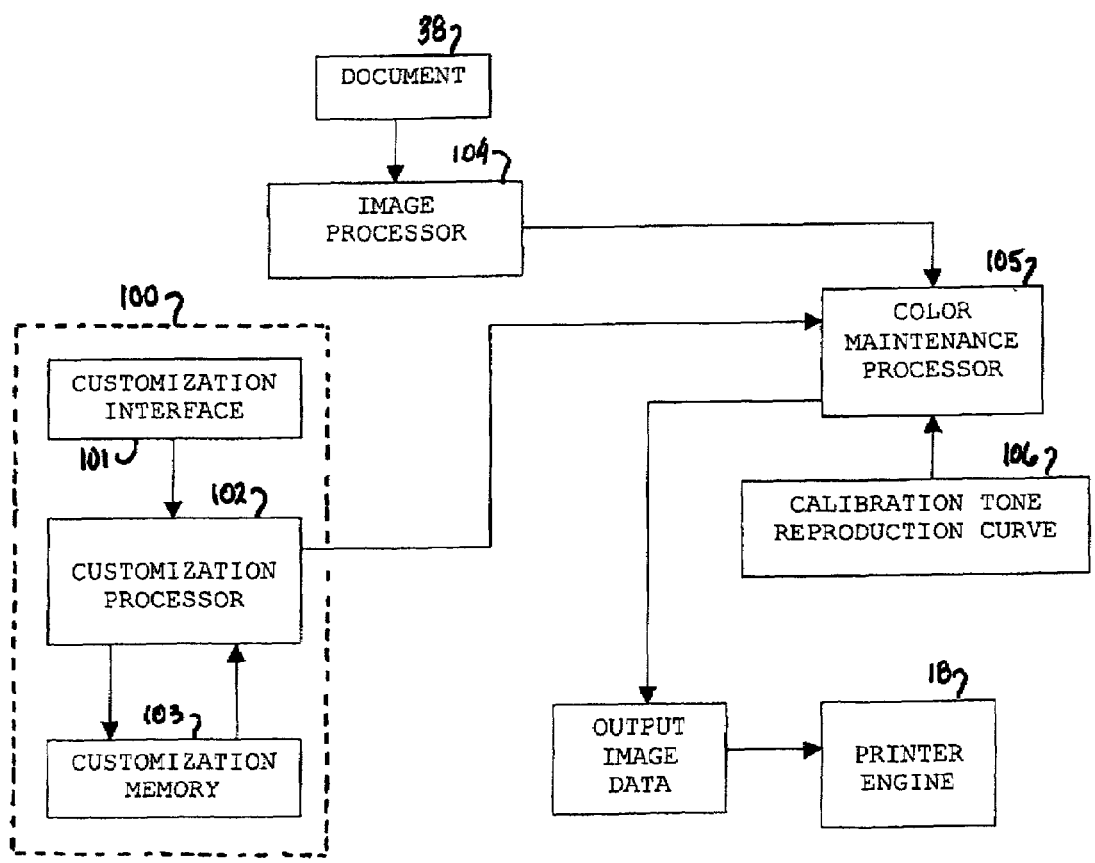
FIG. 2 is a block diagram of the customization system of this invention.
Figure 3:
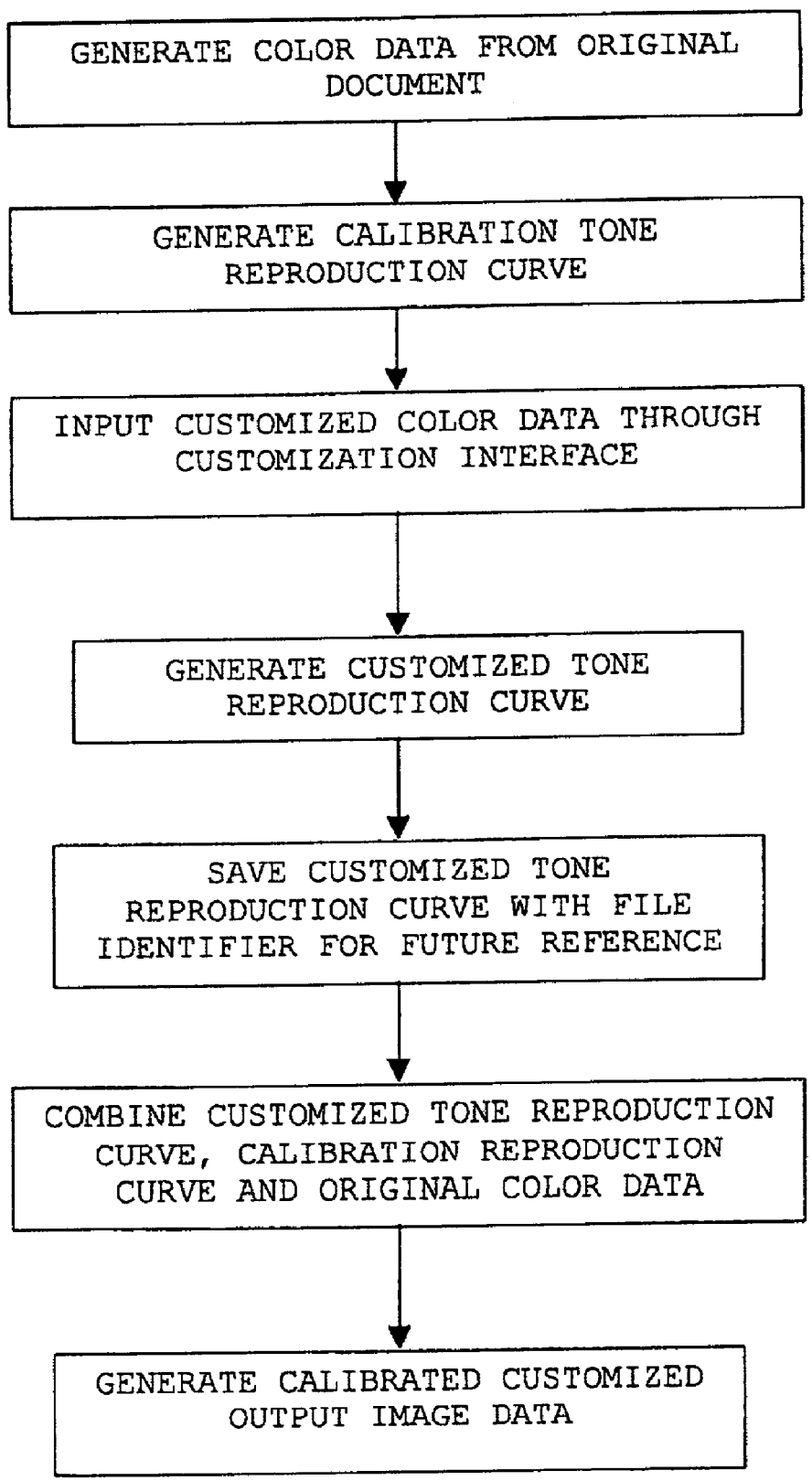
FIG. 3 is a flow diagram illustrating the customization steps of this invention.

In accordance with this invention, the system illustrated in FIG. 1 is modified to provide the user with both flexibility and accuracy in customizing the output color data. This is accomplished, as shown in FIGS. 2–3, by allowing the user to input customized tone reproduction curves which can be saved, transferred, and reused as needed. Tone reproduction curves represent the correspondence between the input and output intensity values of the color. Typically these values are specified as 8-bit unsigned integers, ranging from 0–255, where 0 is no color and 255 is full color. With this range of color values, the tone curve may contain as many as 256 data points in which there is an output value for every possible input value. The tone reproduction curves could include more data points if a finer granularity is specified.

Generally there will be one tone reproduction curve for each toner used in the printing process, for example, if the printing process uses cyan, magenta, yellow, and black toners, there would be a separate customized tone reproduction curve for each of these four toners. By using a customized tone reproduction curve the color tones of an image can be adjusted according to the user's preference.

As shown in FIG. 1, the system of this invention employs a color maintenance system which utilizes predetermined calibration tone reproduction curves which are used to calibrate the color rendering characteristics of the system. These calibration set points may be updated by scheduled periodical monitoring to compensate for changes in the print system with age, atmospheric condition, or other factors. In some systems a degree of adjustment is provided by allowing the user to adjust the set points of the calibration toner reproduction curve within certain limits. The restrictive boundaries of such adjustment schemes are avoided by the use of this invention, while the benefits of a color maintenance/calibration system based on preset tone reproduction curves are preserved.

As shown in FIG. 2, a customization manager 100 is constructed to provide the functionality of this invention. Manager 100 may be executed by a dedicated processor within the image processor 12 or a separate module. A customization interface 101 may consist of an appropriate display to assist the user in creating tone reproduction curves for a particular application. In addition a data input mechanism is needed at the interface 101 to enter new data points for the custom tone curves. This could be a keyboard, touch screen, or the like. Customization interface 101 may be part of the general user interface of the printer console or it could utilize the capability of a personal computer having the necessary software. The user would select the customization function and be prompted to create the new tone curves by following a specified menu. The user may be presented graphically with a suggested tone curve from memory 103. In this manner the customized data points can be entered directly into the customized tone reproduction curve. A customization processor 102 generates the desired customized tone curves.

A customized memory 103 is also included within the customization manager 100. This could be any appropriate storage medium, for example a disk drive which would provide persistent storage and allow the customized tone curves to be stored on disk for retrieval without regard to printer shut down. Once customized tone curves are generated to the satisfaction of the user, it can be identified and saved in memory 103 for future reference. By supporting the customized tone curve file by named reference, reuse, sharing, and exporting is facilitated. The customization memory 103 becomes a library of special purpose tone curves which can be attached and or applied to particular jobs, pages in a job, objects within a page or a different application.

The image processing system of this invention may be arranged in a variety of configurations. The essential elements relative to the customization manager 100 are shown in FIG. 2. Color image data from original document 38 is generated at image processor 104. A calibration tone curve for each toner is generated by the color maintenance processor 105. The calibrated tone reproduction curves are stored in memory 106 and used to adjust the color intensity values for consistent color tone in color maintenance processor 105.

The color maintenance processor 105 may also read customized tone curves when they are generated by the customization manager 100. In the latter instance the color maintenance processor 105 combines the color data from original document 38 with the customized tone reproduction curves and generates customized color data which could be stored as a separate data file, if desired. Saving the customized color data prior to calibration allows such data to be used at a later time and subjected to the then current calibration curve to insure accuracy. In order to accurately reproduce the color tones requested by the user, the customized color data is combined with the current calibration tone reproduction curves. The customized tone curves and the calibration reproduction curves are maintained independently. In this manner the integrity of the calibration tone reproduction curves and the accuracy and reliability of color printing is not compromised, as may occur in other adjustment schemes. The combination of the customized tone reproduction curve with the original document color data could be accomplished in the customization processor if desired and then submitted to the calibration processor for application of the current calibration tone reproduction curve.

It should be understood that the system shown in FIG. 2 is for illustration only as the various components shown may form part of one or the other of the components, for example the customization processor could accomplish the combination of the customized tone reproduction curve with the original color data. It could also form a module within the image processor or color maintenance processor. The flow of information and steps, as shown in FIG. 3, will necessarily follow an equivalent path even though the hardware is executed in a single or multiple component configuration.

In operation, the system of this invention executes a basic method. Customized color data is generated at the customization manager. This may be entered by directly manipulating data points on a set of tone reproduction curves presented to the user on the user interface. The customized color data points are used to generate customized tone reproduction curves for each toner in the system. The customized tone reproduction curves may be saved in memory supported by named reference. This allows a customized set of tone curves to be applied to another job or groups of jobs by user instigation. To provide further flexibility the customized tone curves can be attached to a particular job, groups of jobs, specific pages, or objects. This flexibility is facilitated by the separation of the customized tone reproduction curves from the calibration tone reproduction curves.

In a well known manner original color image data is obtained from a document and further processed in the color maintenance processor 105 of the printer control system. The customized tone reproduction curves are conveyed to the color maintenance processor where they are combined with the original color data from the image processor. The current calibration tone reproduction curves can then be applied by color maintenance processor 105 to produce customized and calibrated color image data.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention as defined by the claims.

We claim:

1. A system for processing a color image in a printing machine having color rendering characteristics comprising:
    an image processor for generating original color image data from an original item to be printed for the purpose of forming an electrostatic latent image on a photoconductive belt of said printing machine;
    said system further comprising a customization manager comprising:
        a customization user interface adapted to allow a user to enter data for generating customized tone reproduction curves;
        a customization processor constructed to receive the data entered by said user at said customization interface and generate at least one set of customized tone reproduction curves;
        a customization memory for storing said at least one set of customized tone reproduction curves for future use;
        wherein said image processor and said customization processor are connected to combine said at least one set of customized tone reproduction curves with said original color image data to generate customized original color image data; and
    a color maintenance processor including a memory for storing at least one set of calibration tone reproduction curves and wherein said color maintenance processor combines said customized original color image data with said at least one set of calibration tone reproduction curves to generate calibrated and customized original color image data.

2. A system for processing a color image in a printing machine having color rendering characteristics, as described in claim 1 wherein the set of customized tone reproduction curves are stored in said customization memory supported by named reference to create a library of customized tone reproduction curves which is accessible for flexible use.

3. A system for processing a color image in a printing machine having color rendering characteristics, as described in claim 1 wherein said customized original color image data are stored prior to calibration for future use and calibration.

4. A system for processing a color image in a printing machine having color rendering characteristics, as described in claim 1 further comprising a general user interface for operating said printing machine, wherein said customization user interface is presented as part of said general user interface.

5. A system for processing a color image in a printing machine having color rendering characteristics, as described in claim 1 further comprising a computer network in which said customization user interface is adapted for use on a personal computer which is connected to said computer network.

6. A customization system for generating independent tone reproduction curves for use in an image processing system of a printing machine having color rendering characteristics, said image processing system having a color maintenance processor for combining at least one set of calibration tone reproduction curves with original color image data, and adjusting said color image data to compensate for said color rendering characteristics; said customization system comprising:
    a customization user interface adapted to allow a user to enter data for generating customized tone reproduction curves;
    a customization processor constructed to receive the data entered by said user at said customization interface and generate at least one set of customized tone reproduction curves;
    a customization memory for storing said at least one set of customized tone reproduction curves for future use; and
    wherein said color maintenance processor and said customization processor are connected to combine said at least one set of customized tone reproduction curves with said original color image data to generate customized original color image data, and further wherein said color maintenance processor is adapted to combine said customized original color image data with said at least one set of calibration tone reproduction curves to generate calibrated and customized original color image data.

7. A customization system for generating independent tone reproduction curves for use in an image processing system of a printing machine having color rendering characteristics, according to claim 6, wherein said at least one set of customized tone reproduction curves is stored in said customization memory supported by named reference to create a library of customized tone reproduction curves which are accessible for flexible use.

8. A customization system for generating independent tone reproduction curves for use in an image processing system of a printing machine having color rendering characteristics, according to claim 6, wherein said customized original color image data are stored prior to calibration for future use and calibration.

9. A customization system for generating independent tone reproduction curves for use in an image processing system of a printing machine having color rendering characteristics, according to claim 6, further comprising a general user interface for operating said printing machine, wherein said customization user interface is presented as part of said general user interface.

10. A customization system for generating independent tone reproduction curves for use in an image processing system of a printing machine having color rendering characteristics, according to claim 6, further comprising a computer network connected with said printing machine in which said customization user interface is adapted for use on a personal computer which is connected to said computer network.

11. In an image processing system of a printing machine, a customization method for generating customized tone reproduction curves for use in said image processing system comprising the steps of:
    generating data representing an original color image from an original item to be printed;
    entering data for generating customized tone reproduction curves;
    processing said entered data and generating at least one set of customized tone reproduction curves;
    storing said at least one set of customized tone reproduction curves for future retrieval and use; and
    processing said at least one set of customized tone reproduction curves by combining said at least one set of customized curves with said generated original color image data to generate customized original color image data;
    generating at least one set of calibration tone reproduction curves;
    storing said at least one set of calibration tone reproduction curves; and calibrating said customized original color image data by combining said customized color image data with said at least one set of calibration tone reproduction curves to generate calibrated customized original color image data.

12. In an image processing system of a printing machine, having color rendering characteristics, the method according to claim 11, further comprising the step of storing the customized tone reproduction curves in said customization memory supported by named reference to create a library of customized tone reproduction curves which is accessible for flexible use.

13. In an image processing system of a printing machine, having color rendering characteristics, the method according to claim 11, further comprising the step of storing said customized original color image data, prior to calibration, for future use and calibration.

14. In an image processing system of a printing machine, having color rendering characteristics, the method according to claim 11, wherein the step of entering customized image data is accomplished at a customization user interface that is presented as part of general user interface for operating said printing machine.

15. In an image processing system of a printing machine, having color rendering characteristics, in the method according to claim 11, wherein the step of entering customized image data is accomplished at a personal computer which is connected to a computer network which includes said printing machine.

16. In an image processing system of a printing machine, having color rendering characteristics, in the method of claim 11, wherein said at least one set of calibration tone reproduction curves is combined with said at least one set of customized tone reproduction curves.

17. In an image processing system of a printing machine, having color rendering characteristics, the method according to claim 11, wherein said at least one set of calibration tone reproduction curves is combined with said original image color data and the resulting calibrated original color image data is combined with said at least one set of customized tone reproduction curves to obtain customized, and calibrated original color image data.

* * * * *